United States Patent
Katz et al.

(10) Patent No.: US 6,534,568 B1
(45) Date of Patent: Mar. 18, 2003

(54) POWDER COATING OR ADHESIVES EMPLOYING SILANES OR SILANE TREATED FILLERS

(75) Inventors: Lawrence E. Katz, Orange, CT (US); Herbert E. Petty, Bethel, CT (US); Shiu-Chin Huang Su, Croton-on-Hudson, NY (US); Bruce A. Waldman, Peekskill, NY (US); Bruce C. Barbera, Beacon, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/446,609

(22) PCT Filed: Apr. 21, 1999

(86) PCT No.: PCT/US99/08694

§ 371 (c)(1),
(2), (4) Date: Apr. 19, 2000

(87) PCT Pub. No.: WO99/55754

PCT Pub. Date: Nov. 4, 1999

Related U.S. Application Data

(63) Continuation-in-part of application No. 09/065,911, filed on Apr. 24, 1998, now abandoned, and a continuation-in-part of application No. 09/115,791, filed on Jul. 15, 1998, now abandoned, and a continuation-in-part of application No. 09/157,658, filed on Sep. 21, 1998, now abandoned.

(51) Int. Cl.$^7$ ................................................ C08K 9/06
(52) U.S. Cl. ..................... 523/212; 523/213; 524/188; 524/431; 524/904; 556/420; 427/387
(58) Field of Search ..................... 556/720; 427/387; 524/188, 904, 431; 523/212, 213

(56) References Cited

U.S. PATENT DOCUMENTS

| | | | |
|---|---|---|---|
| 4,031,120 A | 6/1977 | Gervase | 260/448.8 |
| 4,118,536 A | 10/1978 | Beardsley et al. | 428/413 |
| 4,151,154 A | 4/1979 | Berger | |
| 4,207,359 A | * 6/1980 | Hannon et al. | 428/34.7 |
| 4,413,079 A | 11/1983 | Disteldorf et al. | 524/169 |
| 4,463,154 A | 7/1984 | Disteldorf et al. | 528/45 |
| 4,476,054 A | 10/1984 | Disteldorf et al. | 260/239 |
| 4,483,798 A | 11/1984 | Disteldorf et al. | 260/239 |
| 4,871,590 A | * 10/1989 | Merz et al. | 427/387 |
| 4,912,210 A | 3/1990 | Disteldorf | 540/202 |
| 4,929,724 A | 5/1990 | Engbert et al. | 540/202 |
| 4,997,966 A | * 3/1991 | Lohmann et al. | 556/420 |
| 5,166,302 A | 11/1992 | Werner et al. | 528/67 |
| 5,190,607 A | 3/1993 | Werner et al. | 156/331.1 |

(List continued on next page.)

FOREIGN PATENT DOCUMENTS

| | | |
|---|---|---|
| EP | 230145 A | 12/1986 |
| EP | 310704 A | 11/1987 |
| EP | 0 770 634 A2 | 5/1997 |
| EP | 0 796 882 A2 | 9/1997 |
| WO | 90/05382 | 5/1990 |
| WO | 96/39468 | 12/1996 |
| WO | 97/03101 | 1/1997 |
| WO | 9908694 | 4/1999 |

OTHER PUBLICATIONS

Schrantz, "Foundations for Powder", *Industrial Paint & Powder*, pp. 22–24, Dec. 1993.
Green et al, "Using Acrylic Powder Coatings in Automotives", *Paint & Coatings Industry*, pp. 49–50, Sep. 1995.
Meschievitz, "USCAR: Automotive Powder Clearcoat Experience", *Metal Finishing*, pp. 15–22, Aug. 1997.
Bailey, "Automotive Powder Clears", *Industrial Paint & Powder*, pp. 17–20, Sep. 1997.
Cole, "Automotive Takes a Powder", *Industiral Paint & Powder*, pp. 24–26, Dec. 1993.
Misev, "Power Coatings Chemistry and Technology", p. 144–149, 170 & 171, date unknown.
Guida, "Blocking Agent–Free PU Crosslinking For Powder–Coatings", *Modern Paint and Coatings*, p. 34, 36–38, 7/96.
Grolitzer et al, "Raw Materials: Flow Modifiers, Selecting flow modifiers for high–performance powder coatings", Powder Coatings, p. 15–26, 10/97.
Freudenberg, "Polyuretdione Hardeners for Non–Blocked Polyurethane Powder Coatings", *PRA, International Center for Coatings Technology*, p. 1–15, Paper 39, date unknown.
Chem. Abstract 1998: 41993, abstract JP 10–7804 (Jan. 13, 1998).
Chem Abstract 1998; 8658, abstracting JP9–328489 (Dec. 22, 1997).
Chem. Abstract 1985: 96632; and WPI Acc. No. 84–279341/198445, both abstracting JP 59–172573 (Sep. 29, 1984).
Chem. Abstract: 460885, abstracting EP 354472 (Feb. 14, 1990).

*Primary Examiner*—Robert Dawson
*Assistant Examiner*—Jeffrey B. Robertson
(74) *Attorney, Agent, or Firm*—Michael P. Dilworth

(57) ABSTRACT

Powder coating or adhesive formulations include as a component thereof a silane of formula (I) or hydrolyzates or condensates thereof

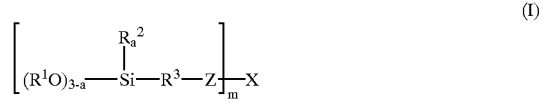

(I)

where $R^1$ is a hydrocarbon, acyl, alkylsilyl, or alkoxysilyl group, $R^2$ is a monovalent hydrocarbon group; $R^3$ is alkylene, optionally interrupted with one or more ether oxygen atoms; a is 0 or 1; Z is a direct bond or a divalent linking group; X is an m-valent organic group or H; and m is 1–20. The silanes are useful as crosslinkers, property modifiers and/or adhesion promoters. Powder adhesives may be similarly formed with the silanes of formula (I). Fillers or pigments, such as titanium dioxide fillers, which are treated with silanes, especially silanes having alkyl, epoxy, acryl, methacryl, polyether, amino, acid anhydride, hydroxyalkyl, carbamato or ureido functionality, may also be usefully employed in powder coating formulations.

4 Claims, No Drawings

U.S. PATENT DOCUMENTS

| | | | |
|---|---|---|---|
| 5,455,080 A | 10/1995 | van Ooij | 427/470 |
| 5,539,031 A | 7/1996 | van Ooij | 524/188 |
| 5,539,045 A | 7/1996 | Potts et al. | 524/588 |
| 5,596,066 A | 1/1997 | Laas et al. | 528/73 |
| 5,646,213 A | 7/1997 | Guo | 524/562 |
| 5,905,150 A * | 5/1999 | Simonian et al. | 544/221 |
| 5,932,678 A * | 8/1999 | Meier et al. | 428/28 |
| 6,268,456 B1 * | 7/2001 | Gregorovich et al. | 528/35 |

* cited by examiner

POWDER COATING OR ADHESIVES EMPLOYING SILANES OR SILANE TREATED FILLERS

This application is a US National Stage entry of PCT/US99/08694 filed Apr. 21, 1999, and is a continuation-in-part of each of U.S. application Ser. No. 09/065,911 filed Apr. 24, 1998, now abandoned; Ser. No. 09/115,791 filed Jul. 15, 1998, now abandoned; and U.S. application Ser. No. 09/157,658 filed Sep. 21, 1998, now abandoned.

FIELD OF THE INVENTION

This invention pertains to powder coating and adhesive formulations utilizing organosilane compounds, or their hydrolyzates or condensates, as crosslinkers and/or adhesion promoters.

BACKGROUND OF THE INVENTION

Powder coatings are an environmentally friendly system, making them a desirable alternative to conventional solvent borne coating systems. Overall, operating and material costs are such that powder coating competes favorably with the solvent and waterborne markets.

Although powder coatings represent only a portion of the total market, as compared to solvent type systems, the technology has considerable advantages. Most notably, since powder coating lacks solvent, there are no VOC issues with which to be concerned. Further, since there is less waste generated, the powder coating technique has less impact on the environment.

Powder coating involves several steps, the most critical of which is the premixing of the ingredients. During this initial phase, the binder, together with the other additives are mixed thoroughly in the equipment. Inadequate premix in the first stage could lead to a non-homogenous composition of the coating and poor mechanical properties or surface defects in the final product. The resulting premix is then fed into an extruder. The molten material produced from the extruder is cooled and squeezed into easily breakable strips. The strips are then ready for grinding to a particular particle size range.

The most common method for the application of powder coatings is by electrostatic spraying. The basic principle of this method involves propelling the powder, via compressed air, through a spray gun where it becomes electrostatically charged. In addition to charging the powder the gun also serves to deposit the powder supplied by the feeder. When the electric field is removed, the charged particles are still held on the surface, attracted by charges on the substrate. The uncharged powder in the overspray is collected and reused.

Another commonly used method of powder coating is triboelectric spraying. This is similar to electrostatic spraying, except the particles are positively charged (electrostatically charged particles have a negative charge). A new technique, that is being developed for flat surfaces, employs electromagnetic brush technology which enables efficient high speed application of very thin layers with no recycling.

Among the drawbacks of thermoset powder coating systems is the difficulty in making tough films from ingredients that are low in molecular weight and therefore able to flow easily under shear conditions. Since the application of the powder coating involves overspraying, specialized recovery equipment is also necessary to reclaim the unused powder. Substrates must also be able to withstand the powder coating cure temperatures which typically range between 150 and 190° C.

The silanes of the present invention advantageously can be used to improve the physical and chemical properties of thermoplastic powder coatings. These powder coating formulations do not require curing agents and can be applied via the aforementioned electrostatic or tribostatic spray techniques. However, most thermoplastic powder is applied by passing the heated substrate through a fluidized bed.

Silanes are known to be useful in liquid coatings. For example in WO 96/39468 sprayable liquid coating compositions are described which include a film-forming reactive silyl group-containing compound and polymer microparticles insoluble in the liquid coating composition.

SUMMARY OF THE INVENTION

One aspect of the invention is a powder coating or adhesive formulation which includes as components thereof (A) at least one silane of the formula I:

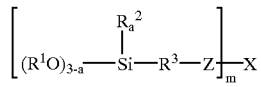

or the hydrolyzates or condensates of such silane, where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; Z is a direct bond or a divalent organic linking group; X is an m-valent organic group or H; and m is 1–20, and (B) at least one organic resin component.

One embodiment of the invention is a powder coating or adhesive formulation as described above where the silane has the formula:

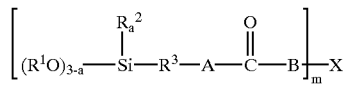

wherein A and B are independently NH or O and $R^1$, $R^2$, $R^3$, a and m are as previously defined. In some embodiments the silane is a carbamate compound of formula II, i.e. one of A and B is NH and the other is O.

Silane carbamate compounds of formula II having a melting point in the range of about 30° C. to about 170° C. make up a further aspect of the invention.

Silanes, useful in the present invention, can be prepared via many synthetic routes. For instance, a terminally unsaturated organic compound can be hydrosilylated to give a silane. Further chemical reactions can be carried out on silanes having organo functional groups. Silyl carbamates, useful in the invention can be prepared by reaction of polyol compounds with isocyanatopolyalkoxysilanes. Other carbamates, useful in the invention can be prepared by reaction of polyisocyanates with hydroxyalkylpolyalkoxy silanes. Such silyl carbamates can also be made by reaction of a polyisocyanate with a terminally unsaturated alcohol, and subsequent hydrosilation of the reaction product thereof. Silyl isocyanates can be oligomerized to: uretdiones, allophanates, biurets, isocyanurates. Silyl amines can be reacted with anhydrides to yield amides or with isocyanates to yield ureas.

Powder coatings or adhesives within the invention may be based on a conventional resin system. In such coatings the silane component of formula I function as property modifying and/or crosslinking additives. Silane compounds of formula I, where m is greater than 1, and especially those in which X is polymeric, may be used as the base crosslinking resin for the coating formulation.

The silane may be coupled with fillers or pigments. This is accomplished by means of a hydrolysis or condensation reaction mechanism in which the silane compound actually reacts with the filler or pigments. Powder coatings employing such treated fillers or pigments make up yet another aspect of the invention. Preferred such fillers or pigments are ones in which the silane has an alkyl, epoxy, acrylate, methacrylate, acid anhydride, polyether, hydroxyalkyl, or amine (especially primary or secondary amine) group, thereon or the silane is one of formula II. Novel TiO$_2$ fillers treated with silanes of formula II or of formula III $$Q-R^3-Si(OR^1)_aR^2_{3-a} \qquad \text{III}$$

where Q is a monovalent organic group having at least one epoxide, amine, methacryl, acryl, acid anhydride or hydroxyalkyl functionality and $R^1$, $R^2$ and $R^3$, are as previously defined constitute a further aspect of the invention. Novel fillers and pigments treated with a silane of formula II, make up yet a further aspect of the invention.

DETAILED DESCRIPTION OF THE INVENTION

Powder coating systems may be based on an organic resin system including thermoplastic materials and thermosettable materials. The term "resin" is used in the art to refer to materials which are settable. Thermoplastic polymers are "resins" because they are settable from the melt form. Thermosetting materials generally are commonly referred to as resins regardless of their status as polymers, prepolymers or monomers. Herein, the term "resin" includes both thermoplastic polymers and thermosetting materials.

Powder coating systems may be based on a number of thermosetting chemistries. Well known powder coating systems include polyurethane systems based on blocked polyisocyanates and polyols, especially polyester or poly(meth)acrylate polyols; acid functional acrylic or other acid functional polymers cured with epoxy functional curing agents; anhydride/epoxy systems; epoxy/polyol systems; hybrid systems employing epoxide resins and polyesters with both carboxyl and hydroxyl functionality; systems based on hydroxyalkylamides and acid functional polymers. Examples of suitable epoxy resins include bisphenol A-type polyepoxides, glycidyl methacrylate copolymers and epoxynovolac resins. Typically the systems are designed to meltflow and to cure concurrently in a single heating step, although in some cases a UV curing system may be employed to separate the film-forming melt flow stage from the curing stage.

Particular powder coating systems in which the inventive compounds are useful include polyester-urethane powder coatings in which hydroxyl-functional polyester resins are cured with polyisocyanates. The polyisocyanates are blocked internally or blocked with a blocking agent. The leading blocking agent is e-caprolactam. When the powder-coated part is heated, the e-caprolactam is volatilized, unblocking the isocyanate groups and leaving them free to react with the hydroxyl functionality on the polyester resin. The most common blocked-isocyanate is the caprolactam-blocked IPDI (isophoronediisocyanate) such as Hüls Vestagon B1530. The polyisocyanates can be blocked internally by a self-condensation process to form uretdione. One such uretdione compound that is commercially available is Hüls Vestagon BF 1540 (an IPDI uretdione).

Typical hydroxyl-functional polyester resins used in polyester-polyurethane systems are derived from condensation polymerization of glycol, dicarboxylic acid and polyol (more than two hydroxyl groups in the monomer). Frequently used glycols are trimethylpentanediol and neopentyl glycol; polyols include trimethylolpropane and trimethylolethane. Dibasic acids include isophthalic acid and terephthalic acid. A standard method of preparation of hydroxyl-functional polyester resin for polyurethane powder coating with reaction details is given in the book of Oldering and Hayward [Oldering, P., and Hayward, G., in Resins for Surface Coatings, Vol. II, SITA Technology, London, 1987, p.137.]. Different patents describe methods for making hydroxyl functional polyester resin for polyurethane powder coatings with minor variations with respect to the acid value, hydroxyl value, functionality of the resin and the choice of the raw materials. The hydroxyl-functional polyester for powder coatings could have an acid number less than 10, a molecular weight of 2800–3200, a hydroxyl number of 84, and a softening point at 95–100° C.

A typical IPDI-crosslinked powder coating formulation is as follows: 52–53% hydroxyl polyester, 12–13% IPDI crosslinker, 34% pigment filler 1% flow modifier and small amount of other ingredients.

Other powder coating systems in which the inventive silane compounds are useful are acrylic-urethane powder coatings. In such systems hydroxyl-functional acrylic resins are used to prepare acrylic-urethane powders in essentially analogous way to polyester-urethanes. The hydroxyl-functional acrylic resins can be prepared as a copolymer of methyl acrylate, styrene, acrylate esters, hydroxyethyl methacrylate and acrylic acid. Typically, about 9–10% of hydroxylethylmethacrylate is needed to yield a resin with a hydroxyl value of 40, and about 2% of acrylic acid to result in acid value of 16. Methyl methacrylate and styrene copolymers yield high Tg (e.g. 95° C.–105° C.) and are usually flexibilized with longer chain acrylates or methacrylates such as butyl, ethyl, or 2-ethylhexyl. Butyl acrylate often is preferred as an acrylic comonomer because its excellent UV resistance combined with high flexibility. The molecular weight of acrylic copolymer resins are usually 5,000–20,000.

Formulations for acrylic-urethane powder coatings are similar to the polyester-urethane formulations except for the use of the acrylic resin in place of the polyester resin.

Still other powder coating formulations in which the silane compounds of the invention may be employed are based on glycidyl functional acrylic resins (especially glycidyl methacrylate copolymers) and compounds having two or more carboxylic acid groups such as dodecanedioic acid. Exemplary glycidyl methacrylate copolymers are made from 15–35 weight percent glycidyl methacrylate, 5–15 weight percent butyl methacrylate and the balance styrene and/or methyl methacrylate; have a number average molecular weight of below 2,500; have a Tg of above 80° C.; and have a melt viscosity of less than 400 poise (40 Pascal seconds) at 150° C.

The inventive silane compounds also may be employed in TGIC/polyester powder coating systems. In such systems carboxyl-functional polyester resins are cured with TGIC (triglycidyl isocyanurate). A polyester resin suitable for production of powder coatings with TGIC in the formulation is described in the patent of DSM resins BV [DSM Resins BV, Belg. Pat 898 099, 1982]. The resin is obtained by fusion esterification of neopentyl glycol, 1,4-cyclohexanedimethanol, 1,6-hexane diol, trimethylolpropane, terephthalic acid and adipic acid. Products with average molecular weight between 4,500 and 12,500 with acid values of 10–26 mg KOH/g and Tg of 40–85° C. are obtained which are suitable for making powder coatings containing 1.4–5.3% by weight of TGIC. The silanes of the present invention can also be used with similar carboxyl functional polyesters that are cured with hydroxyalkylamides.

The powder coating formulations of the invention may also be based on a thermoplastic polymer such as nylon, polyolefins (for instance polypropylene and polyethylene), polyphenylene sulfide or polyvinylchloride.

The softening points of the base components of the powder coating compositions are such that the necessary additives to produce the coating formulations of the invention can be worked in at temperatures between about 80° C. and 140° C. and yet produce a composition which can be subsequently extruded and ground to a fine free-flowing powder of about 20–120 micrometer size. Solid additives that melt and are compatible with the formulation are preferred. However, compatible liquids can be utilized via a master-batch or on an inert carrier.

In one aspect of the invention the powder coating or powder adhesive compositions include therein a silane compound, of formula I:

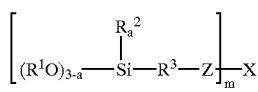  I or a hydrozylates or condensate of such silane compound, where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; Z is a direct bond or a divalent organic linking group; X is an m-valent organic group or H; and m is 1–20. The number m is preferably 2–6, most preferably 2.

The group $R^1$ may be an alkyl, aryl, alkaryl, aralkyl or acyl group, for instance, methyl, ethyl, n-propyl, isopropyl, butyl, t-butyl, phenyl, benzyl, tolyl, benzoyl, or acetyl. $R^1$ may also be an alkylsilyl group, for instance a trialkylsilyl group such as trimethylsilyl, triethylsilyl or tripropylsilyl or an arylalkyldialkylsilyl group such as benzyldimethylsilyl or tolyldimethylsilyl. $R^1$ may also be an alkoxysilyl group, for instance a trialkoxysilyl group such as trimethoxysilyl, triethoxysilyl and tripropoxysilyl; an alkyldialkoxysilyl such as methyldimethoxysilyl, methyldiethoxysilyl, ethyldimethoxysilyl, ethyldiethoxysilyl, methyldipropoxysilyl and ethyldipropoxysilyl; or dialkylalkoxysilyl such as dimethylmethoxysilyl, dimethylethoxysilyl, dimethylpropoxysilyl, diethylmethoxysilyl, diethylethoxysilyl, and diethylpropoxysilyl. Preferably $R^1$ is a linear, branched or cyclic $C_1$–$C_6$ alkyl group or an acetyl group. Most preferably $R^1$ is ethyl or methyl. Suitable $R^2$ hydrocarbon groups are aryl, alkenyl or alkyl groups, which may be linear, branched or cyclic, especially lower ($C_1$–$C_4$) alkyl groups such as methyl or ethyl. $R^3$ is suitably $C_2$–$C_2$ linear, branched or cyclic alkylene, preferably $C_2$–$C_6$ alkylene. Exemplary $R^3$ groups are propylene, ethylcyclohexylene, 3,3-dimethylbutylene, ethylene and methylene.

Z is a direct bond or a divalent organic linking group. Suitable divalent linking groups include ester, amide, urea, uretdione, carbamate, carbonate, aromatic ring, heterocyclic ring, allophanate, biuret, amine, ether and thioether. The Z groups may be the same or different.

The m-valent organic group X is typically a residue of an organic compound having one or more carboxylic acid, halide, alcohol, isocyanate, amine, epoxy, thiol, or other pendant or terminal functional groups which have been reacted in a known manner to form the linkages Z. The residue X may be polymeric, for instance polyacrylate, polycarbonate, polyurethane, polyalkylene, polyester, polyamide, polyether, and combinations of these. Preferably the group X is an aliphatic, cycloaliphatic or aromatic hydrocarbon group, preferably a $C_4$–$C_{24}$ hydrocarbon group, especially a saturated linear, branched or cyclic aliphatic hydrocarbon group. Exemplary X groups include 2,3-butylene; 1,6-hexylene; 1,4-cyclohexanedimethylene; 1,4-cyclohexylene; 1,7-heptylene; 1,8-octylene; 1,12-dodecylene; 1,10-decylene; 1,9-nonylene; 4,4'-isopropylidenediphenylene; 4,4'-isopropylidenedicyclohexylene; 1,4-butylene; phenylene; methylphenylene, 1,3-(α,α,α',α'-tetramethyl)xylylene.

If m=1, then z preferably is a direct bond and x is preferably alkyl or a group having, epoxide, methacrylate, acrylate, or amine functionality. The alkyl may be linear or branched. If alkyl, then the alkyl should be $C_4$–$C_{18}$, more preferably $C_6$–$C_{12}$, most preferably $C_8$.

Preferred silanes useful in the inventive formulations may be characterized by formula II:

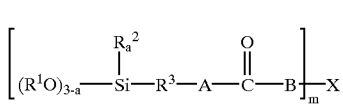  II or the hydrozylates or condensates of such formula, where $R^1$, $R^2$, $R^3$, a, m and X are as previously defined, and A and B are independently —NH— or —O—.

Silyl carbamates of formula II, where A=NH and B=O, may be prepared by reaction of polyol compounds with isocyanatoalkylalkoxysilanes. Novel silane carbamates which may be obtained in this manner include carbamates so formed in which the polyol compound is a hydrocarbon diol. Linearly symmetrical diols such as 1,4-cyclohexanediol, 4,4'-isopropylidenedicyclohexanol and 1,4-cyclohexanedimethanol also produce preferred silane carbamate compounds of the invention. Silyl carbamates of this type can also be made by the reaction of a silyl isocyanate with a polymeric polyol, such as a polyether polyol, a polyester polyol, a polybutadiene polyol or a polyacrylate polyol.

Examples of suitable isocyanatoalkylalkoxysilanes are isocyanatopropyltrimethoxysilane, isocyanatopropylmethyldimethoxysilane, isocyanatopropylmethyldiethoxysilane, isocyanatopropyltriethoxysilane, isocyanatopropyltriisopropoxysilane, isocyanatopropylmethydiisopropoxysilane; isocyanatoneohexyltrimethoxysilane, isocyanatoneohexyldimethoxysilane, isocyanatoneohexydiethoxysilane, isocyanatoneohexyltriethoxysilane, isocyanatoneohexytriisopropoxysilane, isocyanatoneohexyldiisopropoxysilane, isocyanatoisoamyltrimethoxysilane, isocyanatoisoamyldimethoxysilane, isocyanatoisoamylmethyldiethoxysilane, isocyanatoisoamyltriethoxysilane, isocyanatoisoamyltriisopropoxysilane, and isocyanatoisoamylmethyldiisopropoxysilane.

Examples of suitable polyol compounds which will produce solid silyl carbamates with isocyanatoalkylalkoxysilanes include 2,3-butanediol; 1,6-hexanediol; 1,4-cyclohexanedimethanol; 1,4-cyclohexanediol; 1,7-heptanediol; 1,8-octanediol; pentaerythritol; 1,12-dodecanediol; 1,10-decanediol; 3,6-dimethyl-4-octyne-3,6-diol; 1,9-nonanediol; bisphenol A; hydrogenated bisphenol A (i.e., 4,4'-isopropylidenedicyclohexanol); and 1,4-butanediol.

The reaction product of polyol and isocyanatopropyltrialkoxysilane can be a liquid of various viscosities or a solid at room temperature. Solids which have a melting point in the range of about 30° C. to about 170° C. are especially suitable as powder coating additives since they may be added directly to a conventional composition without substantially modifying the melt behavior thereof.

The isocyanatopropylalkoxysilane preferably has a high purity, i.e. above about 95%, and is preferably free from impurities and/or additives, such as transesterification catalysts, which can promote side reactions. Examples of undesirable transesterification catalysts are acids, bases and organometallic compounds. For isocyanatopropyltrimethoxysilane a purity of at least 98% is preferred. This may be accomplished by distilling commercially available isocyanatopropyltrimethoxysilane, available as SILQUEST® Y-5187 silane from Witco Corporation, to remove impurities such as (3-trimethoxysilylpropyl) methylcarbamate and others as well as inhibitors, catalysts and other additives.

The preferred glycols are the symmetrical ones such as 1,4-butanediol, 1,4-cyclohexanediol, and 1,4-cyclohexanedimethanol. While the reaction product of 1,4-butanediol and isocyanatopropyltriethoxysilane is a solid at room temperature, the reaction product of either 1,2-butanediol or 1,3-butanediol with isocyanatopropyltriethoxysilane is a liquid at room temperature. Similarly, the reaction product of 1,4-cyclohexanediol and isocyanatopropyltriethoxysilane is a solid at room temperature but the reaction product of 1,2-cyclohexanediol and isocyanatopropyltriethoxysilane is a liquid at room temperature. An illustrative reaction to produce silane carbamate compounds from a diol is depicted below:

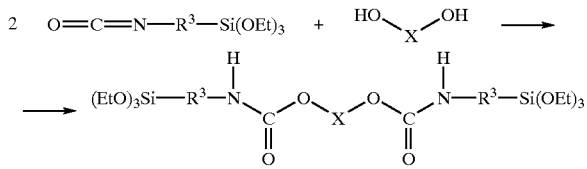

where $R^3$ and X are as previously defined. The reaction is catalyzed by a tin catalyst such as dibutyltin dilaurate (DBTDL); dibutyltin oxide; dibutyltin dichloride; dibutyltin diacetate; dibutyltin dimaleate; dibutyltin dioctoate; dibutyltin bis(2-ethylhexanoate); tin acetate; tin octoate; tin ethylhexanoate; tin laurate. Other urethane catalysts include: K-KAT®s (zirconium, aluminum, or bismuth compounds); diazabicyclo[2,2,2]octane (DABCO); N,N-dimethylcyclohexylamine (DMCA); 1,8-diazabicyclo[5,4,0]-undec-7-ene (DBU); 1,5-diazabicyclo[2,3,0]non-5-ene (DBN). The reactions are typically exothermic and the temperature should be controlled to minimize the color in the final product. Excessive exotherm may also introduce impurities by way of side reaction. It is recommended that the exotherm be controlled so as not to allow the temperature of the reaction mixture to exceed 150° C., more preferably no more than about 110° C.

In a similar way triols, tetrols, pentols and hexols may be reacted with equivalent amounts of isocyanatoalkyltriethoxysilane. Such materials include gylcerine, trimethylolpropane, trimethylolethane, pentaerythritol, inositol, mannitol, sorbitol, fructose, fucose and glucose.

A preferred silane of the invention is the adduct compound prepared from two moles of isocyanatopropyltriethoxysilane and one mole of 1,4-cyclohexanedimethanol.

Examples of these carbamates include bis[3-(triethoxysilyl)propyl]-1,4-cyclohexanedimethyldicarbamate, bis[3-(trimethoxysilyl)propyl]-1,4-cyclohexanedimethyldicarbamate; bis[3-(methyldimethoxysilyl)propyl]-1,4-cyclohexanedimethyldicarbamate; bis[3-triethoxysilyl)propyl]-1,2-cyclohexanedimethyldicarbamate; bis[3-methyldiethoxysilyl)propyl]-1,2-cyclohexanedimethyldicarbamate; bis[3-triethoxysilyl)propyl]-1,4-butanedicarbamate, bis[3-(methyldiethoxysilyl)propyl]-1,4-butanedicarbamate; bis[3-triethoxysilyl)propyl]-2,3-butanedicarbamate; bis[3-(triethoxysilyl)propyl]-1,10-decanedicarbamate; bis[3-(trimethoxysilyl)propyl]-1,10-decanedicarbamate, bis[3-trimethoxysilyl)propyl]-1,6-hexanedicarbamate, tris[3-trimethoxysilyl)propyl]-1,2,3-propanetricarbamate, tris[3-triethoxysilyl)propyl]1,2,3-propanetricarbamate, tris[3-(methyldimethoxysilyl)propyl]-1,2,3-propanetricarbamate.

Other silyl carbamates of formula II, where A═O and B═NH, may be prepared by reaction of an alkoxysilylalcohol with a polyisocyanate. Such silyl carbamates may also be made by reaction of a polyisocyanate with a terminally unsaturated alcohol, and subsequent hydrosilation.

An illustrative reaction to produce a silyl carbamate from a diisocyanate and an alkoxysilylalcohol is depicted below:

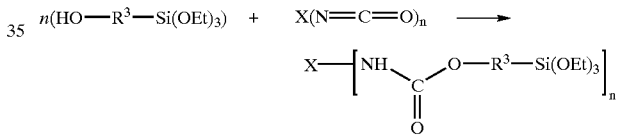

where $R^3$ and X are as previously defined. This reaction may be catalyzed by the aforementioned catalysts and the same recommendations apply. Preferred compounds $X(N$═$C$═$O)_n$ are polyisocyanate prepolymers derived from diisocyanates and polyols. In a similar way triisocyanates, such as IPDI isocyanurate and HDI isocyanurate, may be reacted with equivalent amounts of alkoxysily alcohol. An alkoxysily polyol may be reacted with an equivalent amount of polyisocyanate in this reaction.

Examples of suitable alkoxysilyl alcohols include N(3-methyldiethoxysilylpropyl)-2-hydroxy-1-propyl carbamate; N(3-methyldiethoxysilylpropyl)-1-hydroxy-1-propyl carbamate; N(3-triethoxysilylpropyl)-2-hydroxy-1-propyl carbamate; N(3-triethoxysilylpropyl)-1-hydroxy-1-propyl carbamate; N-(3-trietyoxysilylpropyl)-4-hydroxybutyramide. Other examples are described in U.S. Pat. No. 5,587,502, the teachings of which are incorporated herein by reference. Suitable polyisocanates include, but are not limited to: 1,6-hexane diisocyanate (HDI); isophorone diisocyanate (IPDI); 2,4-toluene diisocyanate; 2,6-toluene diisocyanate; mixtures of 2,4-toluene diisocyanate and 2,6-toluene diisocyanate (TDI); diphenylmethane 4,4-diisocyanate (MDI); bis(4-isocyanatocyclohexyl)methane ($H_{12}$MDI); 1,3-(α,α,α',α'-tetramethyl)xylene diisocyanate (TXMDI); α,α-dimethylmetaisopropylbenzyl isocyanate (m-TMI); and the dimers, trimers, biurets, allophanates, and other oligomers of such polyisocyanates. The polyisocyanate may also be a polymeric polyurethane "prepolymer", such as those derived from the reaction of the forementioned polyisocyanates and a polyether polyol, a polyester polyol, a polybutadiene polyol or a polyacrylate polyol.

Alternatively, carbamates useful in the present invention may be prepared by reaction of a terminally unsaturated alcohol with a polyisocyanate, and hydrosilyation of the terminally unsaturated polyurethane intermediate in the presence of a suitable catalyst. An example of this reaction sequence, using allyl alcohol and a platinum catalyst, is depicted below:

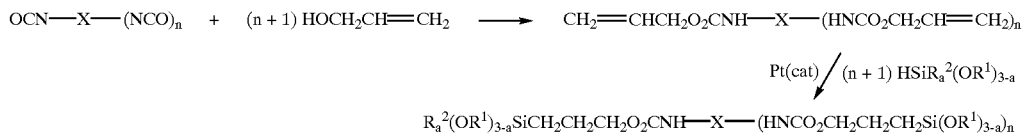

where $R^1$ and $R^2$ are as previously defined, X is an organic residue group and n is 1–10. For example the isocyanate OCN—X—(NCO)$_n$ can be HDI, IPDI, H$_{12}$MDI, TDI, MDI, TMXDI, TMI, or a dimer, trimer, allophanate or oligomeric prepolymer thereof. A terminally unsaturated polymeric alcohol can also be used in the above sequence in place of allyl alcohol. This and other teachings of U.S. Pat. Nos. 5,298,572 and 5,227,434 (and references within these patents) are incorporated herein by reference. Similarly, a terminally unsaturated isocyanate can be reacted with a polyol to give a terminally unsaturated carbamate, which can be hydrosilated in like manner:

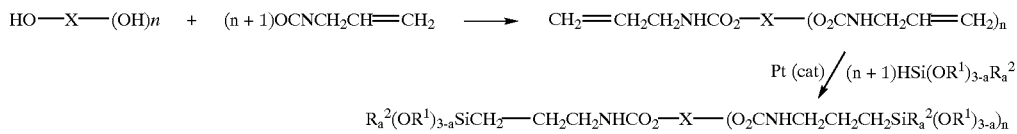

Silane urea compounds may also be employed in the formulations of the invention. Such compounds correspond to formula II where both A and B are NH. They are suitably prepared by reaction of an alkoxysilylalkylamine with an organic isocyanate or by reaction of an organic amine with an alkoxysilylalkylisocyanate. The reaction is analogous to the reaction of isocyanate and alcohol but typically does not require a catalyst.

Examples of alkoxysilylalkylamines include 3-aminopropyltriethoxysilane (SILQUEST® A-1100); 3-aminopropyltrimethoxysilane (SILQUEST® A-1110); 3-phenylaminopropyltrimethoxysilane (SILQUEST® Y-9669); N,N-bis(3-propyltrimethoxysilyl)amine (SILQUEST® A-1170); 3-aminopropyl (methyldiethoxysilane); 3-aminopropyl (methyldimethoxysilane); aminohexyltriethoxysilane (SILQUEST® Y-11637).

Examples of organic (poly)amines include: n-octylamine; n-hexylamine, ethylenediamine; propylenediamine; 1,4-diaminobutane; 1,6-diaminohexane; IPDA; TDA; MDA; H$_{12}$MDA. The organic amine may be polymeric, such as the Jeffamines® (polyether polyamines).

In all of the foregoing descriptions of synthetic methods it will be understood that if trialkoxysilane starting compounds are replaced by corresponding dialkoxyalkylsilanes, triacyloxysilanes or diacyloxyalkylsilanes, other compounds of formula I will be produced.

Other conventional additives additionally may be employed. In preferred processes siloxane slip agent is used during extrusion.

Examples of conventional powder coating additives which may be incorporated into the coating formations of the invention include accelerating catalysts, pigments, leveling agents, flow modifiers, light stabilizers, antioxidants, and fillers, all well known in the art. These ingredients may be employed in the inventive compositions in conventional amounts.

Examples of suitable flow modifiers include, but are not limited to, acrylic resins (usually carried on silica), fluoroaliphatic polymeric esters, and polydimethylsiloxanes (which preferably are solids or high viscosity gels). Flow modifiers are generally used in 0.5–2.0% of the total composition weight.

The catalysts, typically titanium, zirconium, or tin compounds, are conventionally added in amounts of 0.05%–1.5%, preferably 0.1%–0.5% of the total composition weight. Examples of these catalysts are: dibutyltindilaurate; dibutyltindiacetate; dibutyltinditin dioxide; dibutyltindioctoate; tin octoate; titanium isopropoxide; aluminum titanate; chelated titanate; zirconium ethoxide. Various tertiary amines and acids, alone or in combination may be employed to catalyze silane curing. Other silane catalysts are disclosed in U.S. Pat. No. 4,923,945, herein incorporated by reference.

The fillers and colorants may be added in large amounts, often as much as 50% or more, and sometimes 60% or more of the total composition weight. Clearcoat formulations may be entirely free of fillers and pigments.

The silane compounds as described above are useful as crosslinkers, as adhesion promoters, and/or as modifiers of such film properties as environmental resistance or mar resistance. At the elevated temperatures used to cure the powder coating, the carbamate groups of the molecules, if present, can react with isocyanate groups to form allophanates and biurets and/or the SiOR$^1$ groups can react with polyols in the coating in exchange reactions.

Silanes of formula I may be employed alone or in combination with conventional crosslinking agents. They may be used to furnish the principal crosslinking network, or they may reinforce conventional crosslinking networks. In compounds where the group X is polymeric and the compound is a meltable solid, the silane of formula I may be employed as the base resin of the coating system.

In addition to the methods described above, polymeric silanes of the present invention can be synthesized by copolymerizing a silane monomer with a non-silane monomer. For example 3-methacryloxypropyltrimethoxysilane, SILQUEST® A-174, can be added to an alkyl(meth)acrylate monomer such as methyl methacrylate (and/or substituted (meth)acrylates; such as hydroxyethyl acrylate, hydroxyethyl methacrylate, glycidyl acrylate or glycidyl methacrylate) and copolymerized to give a silane functional poly(meth)acrylate (or if glycidyl methacrylate was included, a silane functionalized GMA resin).

Preferred silane compounds used in the formulations of the invention are meltable solids which make them especially suited for incorporation into conventional powder coating formulations without substantially altering the melt properties of the material. Melting points desirably will fall within the range of from about 30° C. to about 170° C., preferably from about 40° C. to about 120° C. and more preferably from about 50° C. to about 110° C.

The molecular weight of the silane compounds of the invention is preferably about 8000 Daltons or less, more preferably about 5000 Daltons or less.

Although solids are a preferred embodiment of the present invention, silanes in the form of liquids or waxes can be used as additives in conventional powder coating resin systems.

A preferred mode of adding silanes that are not solids is via an inert carrier, such as silica, carbon black or porous polymers. Liquids may also be added in the form of solid solutions, as a "master-batch," or encapsulated. Silanes of the present invention may be added to a powder coating formulation via incorporation in/on pigments or fillers. Titanium dioxide is a preferred carrier for these silanes. Silanes in these forms may be added to the powder coating formulation in the same manner as solid silanes.

In a typical powder coating formulation, a useful quantity of the silane additive will be in the range of from about 0.5 to about 30% by weight of the formulation, more preferably from about 2% to about 10% by weight. In some formulations, however, higher or lower amounts may prove beneficial. Further, as noted above, silane compounds of formula I in which X is polymeric may be used as the base resin. Therefore the inventive powder coating formulations should not be considered to be restricted to these quantity ranges.

Silanes that have UV/radiation reactive groups, such as methacrylate (e.g. Silquest® A-174) can be advantageously employed in conjunction with UV/radiation curable powder coatings systems, for instance as disclosed in U.S. Pat. No. 5,703,198. Epoxy functional silanes (e.g. Silquest® A-187) also can be advantageously employed in conjunction with UV/radiation curable powder coating systems, such as disclosed in U.S. Pat. No. 5,789,039.

Powder adhesives may be similarly formulated. Such adhesives may be applied to one or both of the substrates to be joined in the same manner as a powder coating, for instance by electrostatic spraying, triboelectric spraying, electromagnetic brushing or via fluidized bed. The substrates are joined with heating to fuse the coating, and, if not fully cured, allowed to cure. Upon cooling a bonded assembly is formed. Typically the size distribution of such powder adhesives is such that at least 50% by weight will pass through a 200 mesh screen.

As a further aspect of the invention silanes, of formula I, or a hydrozylate or condensate thereof, in which X contains an alkyl, epoxy, acrylate, methacrylate, acid anhydride, polyether, hydroxyalkyl, or amine (especially primary or secondary amine) group, or in which the silane is a silane of formula II, is coupled to a filler or pigment, such as titanium dioxide. Suitably in formula I, m is 1 for such fillers. Mixtures of such silanes may also be used, especially those mixtures with alkyl silanes. The products thereof are useful as powder coating or powder adhesive additives.

Silane treated $TiO_2$ fillers or pigments treated with silanes of formula II or of the formula:

$$Q-R^3-Si(OR^1)_a R^2_{3-a} \qquad \text{III}$$

where Q is a monovalent organic group having at least one epoxide, amine, methacryl, acryl, acid anhydride or hydroxyalkyl functionality and $R^1$, $R^2$ and $R^3$, are as previously defined constitute a further aspect of the invention. The amine may be primary, secondary or tertiary, and for secondary or tertiary amine groups the alkyl side chains may be optionally substituted, for instance with amino or hydroxyl groups. Specific examples of Q—R— groups include glycidoxypropyl; 2-(3,4-epoxycyclohexyl)ethyl; $H_2N-(CH_2)_3-$; $H_2N-(CH_2)_3-NH-(CH_2)_2-$; acryloxypropyl; and methacryloxypropyl. Preferably Q comprises an epoxide group.

The silane is typically coupled with the filler or pigment through hydrolysis or condensation reactions. Typical procedures for treating fillers/pigments with silanes can be found in U.S. Pat. Nos. 4,061,503; 4,151,154; 5,057,151; and 5,562,990 as well as specific references made therein. An extensive list of fillers/pigments that can be treated with silanes can be found in the aforementioned patents, all of which are incorporated herein by reference. Silanes can be condensed onto various carriers in amounts from 1–60%, depending on the nature of the carrier; titanium dioxides can carry up to about 20% of silane and still remain a fine powder. For example, a suitable titanium dioxide can be treated with a solution of an epoxy functional trialkoxy silane, optionally with a cosolvent, and water (at an acidic pH; ~2–5) in a high shear mixing device. Suitable solvents include, but are not limited to: THF; dioxane; methanol; ethanol; DMF; DMSO. The concentration of epoxy functional trialkoxy silane in solution is not critical; however, it is efficient to use a concentrated solution (60–90%) to minimize solvent stripping. After driving off the volatiles, the treated titanium dioxide can be added to the powder coating formulation.

Synergistic effects can be realized when combinations of various silanes are employed. The silanes on the aforementioned carrier may be added to the formulation separately, or as mixtures. The combinations may be prepared in the mixing step, or during extrusion. These synergistic silane combinations can be used in place of conventional crosslinking systems such as TGIC or Primid® XL-552. Many types of titanium dioxide may be employed as carriers for the silanes, these include, but are not limited to: Tiona® RCl-9, RCl-535; Kronos® 2020; Ti-Pure® R-100 series, R-700, R-900. Suitable silica carriers include, but are not limited to: Hubersorb® 600; Hi-Sil® ABS; Zeosil® 1165MP.

Powder coatings of the present invention can, in some cases, be cured further and/or faster by moisture. Normally ambient moisture will eventually completely cure the silanes that may not have cured during the baking step, especially in the catalyzed systems. However, high humidity treatment, hot water, or steam may advantageously be employed to more rapidly attain a complete cure. Thereby, one can utilize embodiments of the present invention for the application of powder coatings on heat sensitive substrates. After spray application the coated substrate is heated to a temperature just high enough to attain the proper flow and leveling. At this lower temperature there is much less crosslinking, the viscosity stays relatively low, and improved flow/leveling can occur. In a second step one can cure the system using moisture. Lower temperature moisture cure can be facilitated by addition of one or more of the aforementioned silane curing catalysts.

The invention is further illustrated by the following non-limiting examples.

EXAMPLE 1

Silane carbamate compounds were prepared by reaction of isocyanatopropyltrimethoxysilane with the polyols listed in Table I. Reactions were run at an approximately 30 g total scale using a 2:1.05 mole ratio of isocyanatopropyltriethoxysilane:diol with a charge of 300–500 ppm dibutyltin dilaurate (DBTDL) catalyst. A 100 ml round bottomed 3-necked flask was equipped with a magnetic stir bar; on the one side was arranged a thermometer. A heating mantle with a thermowatch was included in the set-up. A TEFLON® lubricant was used on the joints. The components were transferred into the flask, including the catalyst charge of 300–500 ppm DBTDL. Under $N_2$, the flask was slowly heated until exotherm occurred. The maximum temperature was held to approximately 100° C. to reduce final product coloration. The reaction was monitored for completion using the IR based on the disappearance of NCO. The appearance and viscosity of the product was recorded. If the product was a solid, a melting point was also determined by DSC (peak temperature). Product form and melting points of the solid products are given in Table 1.

TABLE I

| Polyols Screened | Polyol Structure | Product Form | Product M.P. (° C.) |
|---|---|---|---|
| 1,2-Octanediol | $CH_2(CH_2)_5CH(OH)CH_2OH$ | liquid | |
| 1,4-Cyclohexanediol | $C_6H_{10}(OH)_2$ | white hard chunks | 63.1 |
| 1,12-Dodecanediol | $OH(CH_2)_{12}OH$ | yellow waxy | 56.1 |
| 1,10-Decanediol | $CH_3(CH_2)_7CH(OH)CH_2OH$ | white waxy solid | 48.0 |
| 1,2-Butanediol | $CH_3CH_2CH(OH)CH_2OH$ | pale yellow liquid | |
| 1,3-Propanediol | $HO(CH_2)_3OH$ | pale yellow liquid | |
| 1,5-Pentanediol | $HO(CH_2)_5OH$ | pale yellow liquid | |
| 1,3-Butanediol | $CH_3CH(OH)CH_2CH_2OH$ | yellow liquid | |
| 1,6-Hexanediol | $HO(CH_2)_6OH$ | white waxy solid | 63.3 |
| 1,7-Heptanediol | $HO(CH_2)_7OH$ | solid | 51.1 |
| 1,8-Octanediol | $HO(CH_2)_8OH$ | solid | 58.9 |
| 1,9-Nonanediol | $HO(CH_2)_9OH$ | white waxy solid | 38.8 |
| 2,2-Dimethyl-1,3 Propanediol | $HOCH_2C(CH_3)_2CH_2CH_2OH$ | pale yellow liquid | |
| 2,3-Butanediol | $CH_3CH(OH)CH(OH)CH_3$ | pale yellow waxy solid | 75 |
| 2-Ethyl-2-(hydroxymethyl) 1,3-propanediol | $C_2H_5C(CH_2OH)_3$ | pale yellow liquid | |
| 3,6-Dimethyl-4-Octyne-3,6-diol | $C_2H_5C(CH_3)(OH)C{=}CC(CH_3)(OH)C_2H_5$ | white waxy solid | 73.6 |
| 3-cyclohexene-1,1-dimethanol | $C_6H_9CH_2OH$ | dark yellow liquid | |
| Bisphenol A | $(CH_3)_2C(C_6H_4OH)_2$ | pale yellow waxy solid | not determined |
| Hydrogenated Bisphenol A | $(CH_3)_2C(C_6H_{10}OH)_2$ | yellow moist solid | not determined |
| cis-1,2-Cyclohexanediol | $C_6H_{10}(OH)_2$ | yellow liquid | |
| Esterdiol 204 | $HOCH_2C(CH_3)_2CO_2CH_2C(CH_3)_2CH_2OH$ | yellow liquid | |
| Neopentyl Glycol | $HOCH_2C(CH_3)_2CH_2OH$ | pale yellow liquid | |
| Dipropylene Glycol | $HOC_3H_6OC_3H_6OH$ | pale yellow liquid | |
| Ethylene Glycol | $HOCH_2CH_2OH$ | yellow liquid | |
| 1,4-Butanediol | $HO(CH_2)_4OH$ | white waxy solid | 55.4 |
| Pentaerythritol | $C(CH_2OH)_4$ | white waxy solid | 86.1 |
| Polypropylene Glycol 1000 | $H(OCH(CH_3)CH_2)_nOH$ | dark yellow liquid | |
| trans-1,2-Cyclohexanediol | $C_6H_{10}(OH)_2$ | yellow liquid | |

TABLE I-continued

| Polyols Screened | Polyol Structure | Product Form | Product M.P. (° C.) |
|---|---|---|---|
| 2,3-butanediol (meso form) | $CH_3CH(OH)CH(OH)CH_3$ | white waxy solid | 89.8 |
| 2,2,4-Trimethyl-1,3-pentanediol | $(CH_3)_2CHCH(OH)C(CH_3)_2CH_2OH$ | yellow liquid | |

EXAMPLE 2

Preparation of bis[3-(triethoxysilyl)propyl]-1,4-cyclohexanedimethyldicarbamate

To a two-liter, three-necked flask, equipped with a magnetic stirrer, thermometer, reflux condenser, additional funnel under nitrogen blanket, was added 199.4 grams of melted cyclohexanedimethanol (from Aldrich), 685.6 g of SILQUEST® A-1310 (3-isocyanatopropyltriethoxysilane, from Witco Corp. and 0.44 g of DBTDL. With good mixing and a small heat input, the flask content exothermed to 146° C. The temperature of reaction mixture was maintained at 90–110° C. for 3 hours. Infrared spectra of the reaction mixture was taken at intervals to follow the progress of the reaction. The reaction was considered complete when there was essentially no isocyanate absorption at 2272 cm$^{-1}$. Upon cooling a white solid was obtained. Melting of this material was determined by DSC (differential scanning calorimetry) to be 82.6° C. $^{13}C$ and $^{29}Si$ NMR analyses of the product confirmed the formation of bis[3-(triethoxysilyl)propyl]-1,4-cyclohexanedimethyldicarbamate.

EXAMPLE 3

Preparation of Solid Form bis[3-(trimethoxysilyl)propyl]-1,4-cyclohexanedimethyldicarbamate Commercially available SILQUEST® Y-5187 (3-isocyanatopropyltrimethoxysilane, from Witco Corp) was distilled to give 98.5% purity by GC. Melted cyclohexanedimethanol (21.9 g) and DBTDL (10 ml, 0.0101 g) was charged to a 100-ml three-necked flask equipped with a magnetic stirrer, thermometer, reflux condenser, additional funnel under nitrogen blanket. The contents were heated to 50° C. Distilled Y-5187 (3-isocyanatopropyltrimethoxysilane) was added dropwise with good mixing. An exotherm occurred as soon as the addition started and the temperature of the reaction mixture rose to 100° C. The heating source was removed and the addition of Y-5187 continued at such a rate to keep the internal temperature below 100° C. After the addition was complete, the reaction mixture was held at 85° C. for an hour. No isocyanate was present by infra-red analysis. After cooling to room temperature, the product was a waxy solid.

EXAMPLE 4

Preparation of Liquid Form bis [3-(trimethoxysilyl)propyl]-1,4-cyclohexanedimethyldicarbamate To a two-liter, three-necked flask, equipped with a mechanical stirrer, thermometer, reflux condenser, additional funnel under nitrogen blanket, was added 350.6 grams of melted cyclohexanedimethanol (from Aldrich), and 1.3 g of DBTDL. With good mixing, SILQUEST® Y-5187 silane (953.7 g of 95.3% purity) was added dropwise at such a rate to keep the internal temperature maintained at 70–90° C.

The addition took 3.5 hours to complete. After the addition was complete, the reaction mixture was held at 85° C. for an hour and the mixture was stirred at ambient temperature for 17 hours. The completion of the reaction was confirmed by infra-red spectroscopy. The reaction product was a viscous liquid and had a Gardner Holt viscosity of X+½ (15.3 stokes).

EXAMPLE 5

Preparation of bis[3-(triethoxysilyl)propyl]-1,2-cyclohexanedimethyldicarbamate

To a 100-ml, three-necked flask, equipped with a magnetic stirrer, thermometer, reflux condenser, additional funnel under nitrogen blanket, was added 2.13 g cis-1,2-cyclohexanedimethanol (from Acros), 7.50 g of SILQUEST® A-1310 (3-isocyanatopropyltriethoxysilane, from Witco Corp.) and 0.0119 g of DBTDL (dibutyl tin dilaurate). The reaction mixture was heated at 100° C. for 2 hours. The completion of the reaction was monitored and confirmed by infra red spectroscopy. The reaction product was a viscous liquid.

EXAMPLE 6

Two carboxyl functional polyester resin samples, DSM products P-5500 and P-3900 were obtained. The effect of a solid silane on glass transition temperatures (Tg) of the polyester resins was examined using DSC. The solid silane was the adduct of isocyanatopropyltriethoxysilane and 1,4-cyclohexanedimethanol from Example 2.

In two runs, the Tg of P-5500 was measured as 57.5° C. and 58.2° C., respectively. After adding 5 wt % of the silane, the Tg of the blend was measured as 59.4° C.

The Tg of P-3900 was measured as 59.2° C. After adding 5 wt % of the silane, the Tg of the blend was measured as 58.7° C.

These results illustrate that the Tg of typical resins used in powder applications are not substantially adversely affected by addition of the silane component of the invention.

EXAMPLE 7

Powder coating formulations 7A and 7B were prepared from the ingredients listed in Table II, where the numerical values are parts by weight. The ingredients were dry mixed with a Prism Pilot 3 high speed mixer. The mixture was then extruded at approximately 100° C. on a Werner and Pfleiderer ZSK-30 extruder. The cooled extrudate was ground to a powder in a Retsch/Brinkman ZM-100 grinder. The powder was sieved through a 200 mesh sieve.

TABLE II

| Components | 7A Comparative | 7B Invention |
|---|---|---|
| Glycidyl methacrylate resin (PD 3402, Anderson Development) | 72.18 | 67.85 |
| Dodecanedioic acid | 22.34 | 21.0 |
| Example 2 Silane | 0 | 6.00 |
| Flow Modifier (Modaflow III, Solutia) | 2.18 | 2.05 |
| Tinuvin 900 (Ciba-Geigy) | 1.42 | 1.34 |
| Tinuvin 144 (Ciba-Geigy) | 0.94 | 0.88 |
| Benzoin | 0.94 | 0.88 |

A third formulation, 7C, was prepared by adding to a portion of formulation 7B a sufficient amount of a solvent solution of dibutyltin dilaurate catalyst to attain a catalyst level of 0.053% by weight. The solvent was evaporated.

The three powder coating formulations were electrostatically sprayed (using a Nordson Versa-Spray II gun) onto 3 inch×6 inch×0.032 inch (76 mm×152 mm×0.8 mm) steel Q panels. The coated plates were baked at 180° C. for 18 minutes. Physical property measurements made on the coated panels were:

TABLE III

| Sample | Pencil Hardness[1] | Pendulum (Koenig)[2] sec | Initial Gloss 60° gloss[3] | Initial Gloss 20° gloss[3] | 20° Gloss Retention[4] % | MEK double rubs[5] |
|---|---|---|---|---|---|---|
| 7A | 5H | 176 | 95.1 | 65.3 | 70.6 | 100 |
| 7B | 5H | 169 | 94.8 | 65.0 | 77.5 | 600 |
| 7C | 5H | 162 | 93.6 | 62.4 | 84.3 | 800 |

[1]ASTM D-3363-74
[2]ASTM D-4366-84
[3]ASTM D-523
[4]The cured coating is subjected to abrasion by an AATCC Crockmeter. The panel is coated with a thin, dry layer of BON AMI ® brand cleanser. The finger of the Crockmeter is covered with a felt cloth. Ten double rubs by the Crockmeter finger are applied. The % 20° gloss retention of the damaged area versus the undamaged area is recorded.
[5]ASTM D-4752-87

The results demonstrate improved mar resistance and solvent resistance of the formulations containing the silane of the invention without degradation of the other properties tested.

When coated plates were prepared as above but cured for only 15 minutes at 180° C., formulations 7B, 7C, and a 1:1 by weight mixture of 7A and 7B, all gave pencil hardness results of 5H, whereas formulation 7A, which did not contain any of the inventive silane compound, gave a pencil hardness result of 3H.

EXAMPLE 8

Powder coating formulations 8A and 8B were prepared from the ingredients listed in Table IV, where the numerical values are parts by weight. Commercially available SILQUEST® Y-11570 (1,3,6-tris[propyltrimethoxysilyl] isocyanurate, from Witco Corp.) was employed. The ingredients were dry mixed with a Prism Pilot 3 high speed mixer. The mixture was then extruded at approximately 100° C. on a Werner and Pfleiderer ZSK-30 extruder. The cooled extrudate was ground to a powder in a Retsch/Brinkman ZM-100 grinder. The powder was sieved through a 140 mesh sieve and sprayed on steel substrates as before.

TABLE IV

| Components | 8A Comparative | 8B Invention |
|---|---|---|
| Glycidyl methacrylate resin (PD 3402, Anderson Development) | 72.18 | 70.00 |
| Dodecanedioic acid | 22.34 | 21.67 |
| Silane Isocyanurate (Y-11570) | 0 | 3.00 |
| Flow Modifier (Modaflow III, Solutia) | 2.18 | 2.12 |
| Tinuvin 900 (Ciba-Geigy) | 1.42 | 1.38 |
| Tinuvin 144 (Ciba-Geigy) | 0.94 | 0.87 |
| Benzoin | 0.94 | 0.87 |

Physical property measurements made on the coated panels were:

TABLE V

| Sample | Pencil Hardness | Pendulum (Koenig) sec | Initial Gloss 60° gloss | Initial Gloss 20° gloss | 20° Gloss Retention % | MEK double rubs |
|---|---|---|---|---|---|---|
| 8A | 5H | 192 | 99.2 | 79.7 | 70.6 | 100 |
| 8B | 5H | 200 | 99.5 | 80.6 | 91.2 | 280 |

EXAMPLE 9

Powder coating formulations 9A and 9B were prepared from the ingredients listed in Table VI, where the numerical values are parts by weight. The ingredients were dry mixed on a roller mill. The mixture then was melt mixed at approximately 110° C. on a Braebender mixer. The cooled extrudate was ground to a powder in a Retsch/Brinkman ZM-100 grinder. The powder was sieved through a 140 mesh sieve.

TABLE VI

| Components | 9A Comparative | 9B Invention |
|---|---|---|
| Polyester resin (Crylcoat 450; UCB) | 121.2 | 119.6 |
| Titanium Dioxide (R-960; Dupont) | 66.6 | 65.8 |
| TGIC (Araldite PT810P; Ciba) | 9.2 | 9.1 |
| Example 2 Silane | 0 | 2.5 |
| Flow Modifier (Modaflow III, Solutia) | 2.2 | 2.2 |
| Benzoin | 0.8 | 0.8 |
| Dibutyltin dilaurate | 0 | 0.05 |

The powder coating formulations were sprayed electrostatically (using a Nordson Versa-Spray II gun) onto 3 inch×5 inch×0.032 inch (76 mm×152 mm×0.8 mm) steel Q panels. The coated plates were baked at 180° C. for 15 minutes.

The mar characteristics of these coatings were evaluated using an AATCC Crockmeter test as in the previous example. The results indicated that the silane of Example 2 retained 66.7% of its gloss versus 50.5% for the comparative formulation. This is illustrative of the improvement in mar resistance imparted by the silanes of this invention.

EXAMPLE 10

Silane urea compounds useful as powder coating additives were prepared by reaction of the isocyanate and amine compounds Table VII. Reactions were run at an approximately 30 g total scale using a 1:1.03 equivalent ratio of isocyanate:amine. No catalyst was used in the reactions. Otherwise, reaction conditions were as in Example 1.

TABLE VII

| Isocyanate | Amine | Product Form | Melting Pt. (° C.) |
|---|---|---|---|
| isocyanatopropyl trimethoxysilane | hexamethylene diamine | chunky white solid | 136 |
| isocyanatopropyl trimethoxysilane | ethylene diamine | white waxy solid | 121 |
| isocyanatopropyl trimethoxysilane | 1,2-diaminocyclohexane | brown paste | 114 |
| isocyanatopropyl trimethoxysilane | trans-1,2-diaminocyclohexane | white hard solid | 198 |
| isocyanatopropyl trimethoxysilane | 1,3-diaminopropane | white chunky solid | 116 |
| isocyanatopropyl trimethoxysilane | 1,3-cyclohexane-bis-methylamine | yellow hard solid | 79 |
| isocyanatopropyl trimethoxysilane | 1,4-diaminobutane | yellow-brown chunks | |
| bis-(isocyanatophenyl) methane (MDI) | 3-aminopropyltriethoxysilane | hard white solid | 67 |
| bis-(4-isocyanatocyclohexyl) methane (Desmodur W) | " | hard white solid | 127 |
| 1,6-diisocyanatohexane | " | yellow hard solid | 117 |
| isophorone diisocyanate | " | yellow hard solid | 105 |
| 1,3-bis(isocyanatomethyl) cyclohexane | " | yellow hard solid | 70 |
| bis-(4-isocyanatocyclohexyl) methane (Desmodur W) | 3-aminopropylmethyl diethoxysilane | hard white solid | 77 |

EXAMPLE 11

To a solution of 4.7 g tetrahydrofuran and 0.3 g water, pH adjusted to 3.0 with acetic acid, was added 1.0 g an alkyltriethoxysilane (Silquest® A-137 available from Witco Corp.). This was stirred 20 minutes and then added to 100 g of titanium dioxide (Tiona RCl-9 from the Millenium Inorganic Chemicals) in a Warring blender, under high shear. After drying in an oven at 150° C. the treated titanium dioxide was formulated into a polyester/TGIG powder coating formulation (11B).

To a solution of 1.0 g methanol, 0.85 g water, and 0.2 g acetic acid, was added 11.2 g of a trimethoxyepoxyalkylsilane (Silquest® A-187 available from Witco Corp.). This was stirred 30 minutes and then added to 100 g of titanium dioxide in a Warring blender, under high shear. After drying in an oven at 160° C. the treated titanium dioxide was formulated into a polyester powder coating formulation (11C).

Powder coating formulations 11A, 11B and 11C were prepared from the ingredients listed in Table VIII, where the numerical values are parts by weight. The ingredients were dry mixed with a Prism Pilot 3 high speed mixer. The mixture was then extruded at approximately 100° C. on a Werner and Pfleider ZSK-30 twin screw extruder. The formulations were extruded sequentially, i.e. 11A first, followed by 11B, followed by 11C.

The cooled extrudate was ground to a powder in a Retsch/Brinkman ZM-100 grinder. The powder was sieved through a 140 mesh sieve.

TABLE VIII

| Components | 11A | 11B | 11C |
|---|---|---|---|
| Crylcoat ® 450; UCB, polyester resin | 218.0 | 218.0 | 200.0 |
| R-960; DuPont, titanium dioxide | 160.0 | — | — |
| Silane treated TiO$_2$-Silquest ® A-137 | — | 160.0 | — |
| Silquest ® A-187 | — | — | 92.6 |
| Araldite ® PT810P; Ciba, TGIC | 16.4 | 16.4 | 10.25 |
| Modaflow ® III; Solutia, flow modifier | 4.0 | 4.0 | 3.0 |
| Benzoin | 1.6 | 1.6 | 1.0 |

The powder coating formulations were electrostatically sprayed (using a Nordson Versa-Spray II gun) onto 3"×6"× 0.032" (76 mm×152 mm×0.8 mm) steel Q panels. The coated plates were baked at 180° C. for 18 minutes.

Physical properties of two of the formulations, comparative formulation 11A (a conventional TGIC/polyester powder coating formulation), and Invention (formulation 11C in which a portion of the TGIC has been eliminated), as taken on the coated panels, are reported in Table IX.

TABLE IX

| Sample | Pencil Hardness | Pendulum (Koenig) sec | Initial Gloss 60° gloss | Initial Gloss 20° gloss | MEK double rubs |
|---|---|---|---|---|---|
| 11A | 5H | 188 | 91.6 | 75.2 | 222 |
| 11C | 5H | 186 | 88.0 | 66.0 | 2,000 |

The results demonstrate that replacement of some of the TGIC with the silane treated fillers or pigments of the invention improved solvent resistance of the coating.

EXAMPLE 12

To a solution of 2.0 g methanol, 1.5 g water, and 0.4 g acetic acid, was added 20.0 g of Silquest® A-187 trimethoxyepoxyalkylsilane. This was stirred 30 minutes and then added to 100 g of titanium dioxide in a Warring blender, under high shear. After drying in an oven at 165° C. the treated titanium dioxide was formulated into a polyester powder coating formulation (12A).

Powder coating formulations 12A was prepared from the ingredients listed in Table X, where the numerical values are parts by weight. The titanium dioxide was treated as described in the previous paragraph. The ingredients were dry mixed with a Prism Pilot 3 high speed mixer. The mixture was then extruded at approximately 100° C. on a Werner and Pfleider ZSK-30 twin screw extruder. As in example 11, a formulation as described for 11A was extruded, followed by a formulation as described for 11B, and finally the 12A formulation.

The cooled extrudate was ground to a powder in a Retsch/Brinkman ZM-100 grinder. The powder was sieved through a 140 mesh sieve.

TABLE X

| Components | 12A Invention |
|---|---|
| Crylcoat ® 450; UCB, (polyester resin) | 200.0 |
| Silane treated titanium dioxide | 155.6 |
| Araldite ® PT810P; Ciba-Geigy, TGIC | 1.5 |
| Modaflow ® III; Solutia, flow modifier | 4.4 |
| Benzoin | 1.5 |

The powder coating formulations were electrostatically sprayed (using Norson Versa-Spray II gun) onto 3"×6"× 0.032" (76 mm×152 mm×0.8 mm) steel Q panels. The coated plates were baked at 180° C. for 18 minutes.

The following physical property measurements were obtained for the coated panels.

TABLE XI

| Sample | Pencil Hardness | Pendulum (Koenig) sec | Initial Gloss 60° gloss | Initial Gloss 20° gloss | MEK double rubs |
|---|---|---|---|---|---|
| 11A | 5H | 188 | 91.9 | 75.2 | 222 |
| 12A | 5H | 200 | 83.3 | 46.3 | 600 |

The results demonstrate the improved solvent resistance of formulations containing silane treated fillers or pigments of the invention.

EXAMPLE 13

To a solution of 2.0 g methanol, 1.5 g water, and 0.4 g acetic acid, was added 20.0 g of Silquest® 187 trimethoxyepoxyalkylsilane. This was stirred 30 minutes and then added to 100 g of titanium dioxide in a Warring blender, under high shear. After drying in an oven at 165° C. the treated titanium dioxide was formulated into a polyester powder coating formulation (13A).

Powder coating formulations 13A was prepared from the ingredients listed in Table XII, where the numerical values are parts by weight. The titanium dioxide was treated as described in the previous paragraph. The ingredients were dry mixed with a Prism Pilot 3 high speed mixer. The mixture was then extruded at approximately 100° C. on a Werner and Pfleider ZSK-30 twin screw extruder. As in example 11, a formulation as described for 11A was extruded, followed by a formulation as described for 11B, and finally the 13A formulation.

The cooled extrudate was ground to a powder in a Retsch/Brinkman ZM-100 grinder. The powder was sieved through a 140 mesh sieve.

TABLE XII

| Components | 13A Invention |
|---|---|
| Crylcoat ® 450; UCB, (polyester resin) | 272.5 |
| Silane treated (titanium dioxide) | 200.0 |
| Modaflow ® III; Solutia, flow modifier | 5.0 |
| Benzoin | 2.0 |

The powder coating formulations were electrostatically sprayed (using Norson Versa-Spray II gun) onto 3"×6"× 0.032" (76 mm×152 mm×0.8 mm) steel Q panels. The coated plates were baked at 180° C. for 18 minutes.

The following physical property measurements were obtained for the coated panels.

TABLE XIII

| Sample | Pencil Hardness | Pendulum (Koenig) sec | Initial Gloss 60° gloss | Initial Gloss 20° gloss | MEK double rubs |
|---|---|---|---|---|---|
| 11A | 5H | 188 | 91.9 | 75.2 | 222 |
| 13A | 5H | 200 | 84.6 | 47.3 | 390 |

The results demonstrate that fillers and pigments treated with silanes in accordance with the invention can replace TGIC.

EXAMPLE 14

A solution of 12.5 g amino-bis-(propyltrimethoxysilane) (Silquest® A-1170, available from Witco Corp.) and 2.0 g methanol was added to 100 g of titanium dioxide. After mixing in a Warring Blender, the treated titanium dioxide was air-dried overnight.

Powder coating formulations 14A (a standard TGIC/polyester formulation) and 14B, an invention formulation, were prepared from the ingredients listed in Table XIV, where the numerical values are parts by weight. The treated titanium dioxide was prepared as described in the previous paragraph. The ingredients were dry mixed with a Prism Pilot 3 high speed mixer. The mixtures were then sequentially extruded at approximately 105° C. on a Braebender PL-2000 single screw extruder. Formulation 14A was extruded first, followed by formulation 14B.

The cooled extrudate was ground to a powder in a Retsch/Brinkman ZM-100 grinder. The powder was sieved through a 140 mesh sieve

TABLE XIV

| Components | 14A Comparative | 14B Invention |
|---|---|---|
| Crylcoat ® 450; UCB, (polyester resin) | 218.0 | 200.0 |
| DuPont R-960 titanium dioxide | 160.0 | — |
| Silane treated titanium dioxide | — | 147.0 |
| Araldite ® PT810P; Ciba-Geigy, TGIC | 16.4 | — |
| Modaflow ® III; Solutia, flow modifier | 4.0 | 4.4 |
| Benzoin | 1.6 | 1.5 |

Coated steel Q panels were sprayed and baked as in the previous examples. The following physical property measurements were obtained for the coated panels.

TABLE XV

| Sample | Pencil Hardness | Pendulum (Koenig) sec | Initial Gloss 60° gloss | Initial Gloss 20° gloss | MEK double rubs | Cross Hatch Adhesion[1] |
|---|---|---|---|---|---|---|
| 14A | 5H | 178 | 91.2 | 79.4 | 135 | 4–5 |
| 14B | 5H | 214 | 82.6 | 46.6 | 130 | 4–5 |

[1]ASTM D-3359

The results demonstrate that complete replacement of TGIC with a silane treated filler of the invention is feasible.

EXAMPLE 15

To a solution of 4.7 g tetrahydrofuran and 0.3 g water, pH adjusted to 3.0 with acetic acid, was added 1.0 g a triethoxyalkylsilane (Silquest® A-137 available from Witco Corp.). This was stirred 20 minutes and then added to 100 g of titanium dioxide in a Warring blender, under high shear. After drying in an oven at 150° C. the treated titanium dioxide was formulated into polyester/TGIC powder coating formulations (15B and 15C).

Powder coating formulations 15A, 15B and 15C were prepared from the ingredients listed in Table XVI, where the numerical values are parts by weight. The ingredients were dry mixed with a Prism Pilot 3 high speed mixer. The mixture was then extruded at 100° C. on a Werner and Pfleider ZSK-30 twin screw extruder. Formulation 15A was extruded first, followed by 15B, followed by 15C.

The cooled extrudate was ground to a powder in a Retsch/Brinkman ZM-100 grinder. The powder was sieved through a 140 mesh sieve. Physical properties of the formulations were evaluated. The control, formulation 15A, is a standard TGIC/polyester formulation. Formulations 15B and 15C are comparative examples to show the effect of a silane treatment using an alkyltrialkoxysilane.

TABLE XVI

| Components | 15A Control | 15B Comparative | 15C Comparative |
|---|---|---|---|
| Crylcoat ® 450; UCB, polyester resin | 327.0 | 327.0 | 327.0 |
| R-960; DuPont, titanium dioxide | 240.0 | — | — |
| Silane treated TiO$_2$-Silquest ® A-137 | — | 246.0 | 252.0 |
| Araldite ® PT810P; Ciba, TGIC | 24.6 | 18.6 | 12.6 |
| Modaflow ® III; Solutia, flow modifier | 6.0 | 6.0 | 6.0 |
| Benzoin | 2.4 | 2.4 | 2.4 |

Coated steel Q panels were sprayed and baked as in the previous examples. The following physical property measurements were obtained for the coated panels.

TABLE XVII

| Sample | Pencil Hardness | Pendulum (Koenig) sec | Initial Gloss 60° gloss | Initial Gloss 20° gloss | MEK double rubs |
|---|---|---|---|---|---|
| 15A | 5H | 188 | 90.4 | 64.5 | 204 |
| 15B | 5H | 188 | 88.1 | 39.5 | 12 |
| 15C | 5H | 193 | 95.0 | 51.9 | 14 |

The loss of resistance to MEK rubs, relative to the control, demonstrates that the comparative silane treated filler does not allow replacement of some of the TGIC content of the control formulation.

The above examples and disclosure are intended to be illustrative and not exhaustive. These examples and description will suggest many variations and alternatives to one of ordinary skill in this art. All these alternatives and variations are intended to be included within the scope of the attached claims. For instance, while the preparation of the inventive silane containing powder coating formulations has been primarily exemplified with respect to silanes prepared by the reaction of active hydrogen compounds with isocyantates, it will be understood that other silane compounds within the definition of formula I above may readily be prepared and employed in the inventive formulations. Likewise, other silane treated fillers within the scope of the claims herein may be prepared in a manner analogous to the processes illustrated above. Those familiar with the art may recognize other equivalents to the specific embodiments described herein which equivalents are also intended to be encompassed by the claims attached hereto.

What is claimed is:

1. A composition comprising a filler or pigment treated with at least one silane of formula II:

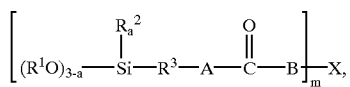

II and hydrolyzates or condensates of said silane, where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; X is an m-valent organic group; one of A and B is NH and the other is O, and m is 2–20.

2. A composition as in claim 1 wherein the pigment or filler is titanium dioxide.

3. A titanium dioxide filler treated with at least one silane of formula II or formula III:

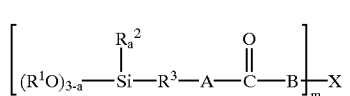

II

III or a hydrolyzate or condensate of the silane of formula II or formula III, where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; X is an m-valent organic group; one of A and B is NH and the other is O, m is 2–20 and Q is a monovalent organic group having at least one epoxide, amine, methacryl, acryl, acid anhydride or hydroxyalkyl functionality.

4. A filler or pigment treated with a silane of formula II:

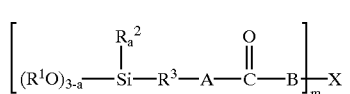

II or a hydrolyzate or condensate of a said silane, where $R^1$ is a hydrocarbon, acyl, alkylsilyl or alkoxysilyl group; $R^2$ is a monovalent hydrocarbon group; $R^3$ is alkylene, optionally interrupted with one or more ether oxygen atoms; a is 0 or 1; X is an m-valent organic group; one of A and B is NH and the other is O, and m is 2–20.

* * * * *